(12) United States Patent
Volkel et al.

(10) Patent No.: US 9,994,463 B2
(45) Date of Patent: Jun. 12, 2018

(54) ELECTROCOAGULATION SYSTEM

(75) Inventors: Armin R. Volkel, Mountain View, CA (US); Meng H. Lean, Santa Clara, CA (US); Kai Melde, San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 1192 days.

(21) Appl. No.: 12/967,172

(22) Filed: Dec. 14, 2010

(65) Prior Publication Data

US 2012/0145647 A1    Jun. 14, 2012

(51) Int. Cl.
| | | |
|---|---|---|
| *C02F 1/46* | (2006.01) | |
| *C02F 1/463* | (2006.01) | |
| *C02F 1/00* | (2006.01) | |

(52) U.S. Cl.
CPC .............. *C02F 1/463* (2013.01); *C02F 1/008* (2013.01)

(58) Field of Classification Search
CPC ........................................................ C02F 1/463
USPC ..................................................... 210/748.17
See application file for complete search history.

(56) References Cited

U.S. PATENT DOCUMENTS

| | | | |
|---|---|---|---|
| 5,143,625 A * | 9/1992 | Ballard ......................... | 210/713 |
| 6,387,275 B1 * | 5/2002 | Chang et al. ................. | 210/712 |
| 6,866,757 B2 | 3/2005 | Gilmore | |
| 7,695,607 B2 * | 4/2010 | Polnicki et al. .............. | 205/757 |
| 8,268,169 B2 | 9/2012 | Lean et al. | |
| 2008/0128331 A1 | 6/2008 | Lean et al. | |
| 2008/0230458 A1 | 9/2008 | Lean et al. | |
| 2009/0050538 A1 | 2/2009 | Lean et al. | |
| 2009/0114601 A1 | 5/2009 | Lean et al. | |
| 2009/0114607 A1 | 5/2009 | Lean et al. | |
| 2009/0283452 A1 | 11/2009 | Lean et al. | |
| 2009/0283455 A1 | 11/2009 | Lean et al. | |
| 2010/0072142 A1 | 3/2010 | Lean et al. | |
| 2010/0140092 A1 | 6/2010 | Volkel et al. | |
| 2010/0314263 A1 | 12/2010 | Lean et al. | |
| 2010/0314323 A1 | 12/2010 | Lean et al. | |
| 2010/0314325 A1 | 12/2010 | Lean et al. | |
| 2010/0314327 A1 | 12/2010 | Lean et al. | |
| 2012/0152546 A1 | 6/2012 | Volkel et al. | |
| 2012/0152855 A1 | 6/2012 | Lean et al. | |
| 2012/0160706 A1 * | 6/2012 | Poirier et al. ................ | 205/756 |

\* cited by examiner

*Primary Examiner* — Peter Keyworth
(74) *Attorney, Agent, or Firm* — Fay Sharpe LLP

(57) ABSTRACT

An electrocoagulation system including a dosing unit, a mixing unit and a buffer tank is provided. The dosing unit receives a fluid from an external source and injects an electrochemically generated coagulant into the fluid using one or more pairs of electrodes. The mixing unit mixes the coagulant with the fluid and is separate from the dosing unit. The buffer tank holds the fluid until particles contained in the fluid grow to a predetermined size.

23 Claims, 6 Drawing Sheets

| Inputs | | |
|---|---|---|
| Parameter | Value | Units |
| Flow Rate [V] | 3.15E-02 | m³/min |
| Equivalent Coagulant Need [C_c] | 1.00E-02 | kg/m³ |
| Solution Conductivity [σ] | 4.80E+00 | S/m |
| Applied Voltage [U] | 1.20E-01 | V |
| Electrode Distance [Δ] | 1.00E-02 | m |
| Faraday Constant [F] | 9.65E+07 | C/kmol |
| Variables | | |
| Variable | Value | Units |
| Ion Concentration [c_i] | 3.70E-05 | kMol/m³ |
| Current Needed to Supply Ion Concentration [I] | 3.75E+00 | A |
| Current Density [i] | 1.50E+01 | A/m² |
| Electrode Area [S] | 2.50E-01 | m² |
| Residence Time [t] | 4.76E+00 | s |

*FIG. 3*

ELECTROCOAGULATION SYSTEM

BACKGROUND

The present exemplary embodiments relate generally to water treatment. They find particular application in conjunction with electrocoagulation, and will be described with particular reference thereto. However, it is to be appreciated that the present exemplary embodiments are also amenable to other like applications.

In water treatment, many different contaminants can be removed more efficiently by using a proper coagulant. The coagulant initiates aggregation of the contaminants to large enough particle sizes for easy removal. Coagulants include, for example, aluminum salts, iron salts, and natural or artificial polyelectrolytes. Typically, the inorganic coagulants are introduced into source water in the form of salts having low concentrations of the actual coagulant ions suspended therein. For example, $FeCl_3*6H_2O$ is a typical coagulant used with salt water, and which contains less than 21% iron by weight.

Another approach for introducing coagulants, which does not suffer from the above noted inefficiency, is electrocoagulation (EC). In EC, a coagulant is produced by electrochemical dissolution of one or more sacrificial electrodes, such as aluminum electrodes, iron electrodes, or the like, under an applied voltage. Dosing can be varied by changing the applied voltage or speed of source water flow past the electrodes. Other advantages of this method include, but are not limited to, reducing sludge generation, emulsion breaking, and the like.

Even though EC has certain advantages over conventional options, it is not as widely used in the water treatment industry. One reason is the variety of electrochemical reactions that can occur depending on source water quality and applied voltage. Many electrochemical reactions do not affect coagulation, whereby energy is wasted unless the electrochemical reactions are controlled and/or limited. Another reason is the need to allow for a good and rapid mixing of the released coagulant ions into the bulk of the source water. For high salinity liquids, such as sea water or some produced waters, the high conductivity of these liquids causes a high dosing current even at low voltages that requires a highly turbulent flow regime to achieve sufficient mixing.

As a result of the above noted challenges, water treatment systems employing EC are often highly adapted to a specific application and hard to adjust to work for other needs. For example, often times, EC systems include a combined dosing and mixing unit, where the shape of the mixing unit and the location of the electrodes are highly dependent upon the particular applications of the EC systems.

The present disclosure contemplates new and improved systems and/or methods for remedying these, and other, problems.

INCORPORATION BY REFERENCE

The following co-pending and commonly assigned applications, the disclosures of each being totally incorporated herein by reference, are mentioned:

U.S. Published Application No. 2009/0050538, entitled, "Serpentine Structures for Continuous Flow Particle Separations", by Lean et al.;

U.S. Published Application No. 2008/0128331, entitled, "Particle Separation and Concentration System", by Lean et al.;

U.S. Published Application No. 2008/0230458, entitled, "Vortex Structure for High Throughput Continuous Flow Separation", by Lean et al.;

U.S. Published Application No. 2009/0114601, entitled, "Device and Method for Dynamic Processing in Water Purification", by Lean et al.;

U.S. Published Application No. 2009/0114607, entitled, "Fluidic Device and Method for Separation of Neutrally Buoyant Particles", by Lean et al.;

U.S. Published Application No. 2010/140092, entitled, "Flow De-Ionization Using Independently Controlled Voltages", by Armin R. Volkel et al.;

U.S. patent application Ser. No. 12/484,071, filed Jun. 12, 2009, entitled, "Method and Apparatus for Continuous Flow Membrane-Less Algae Dewatering", by Lean et al.;

U.S. Published Application No. 2009/0283455, entitled, "Fluidic Structures for Membraneless Particle Separation", by Lean et al.;

U.S. Published Application No. 2009/0283452, entitled "Method and Apparatus for Splitting Fluid Flow in a Membraneless Particle Separation System", by Lean et al.;

U.S. patent application Ser. No. 12/615,663, filed Nov. 10, 2009, entitled, "Desalination Using Supercritical Water and Spiral Separation", by Lean et al.;

U.S. Published Application No. 2010/0072142, entitled, "Method and System for Seeding with Mature Floc to Accelerate Aggregation in a Water Treatment Process", by Lean et al.;

U.S. patent application Ser. No. 12/484,038, filed Jun. 12, 2009, entitled, "Stand-Alone Integrated Water Treatment System for Distributed Water Supply to Small Communities", by Lean et al.;

U.S. patent application Ser. No. 12/484,005, filed Jun. 12, 2009, entitled, "Spiral Mixer for Floc Conditioning", by Lean et al.;

U.S. patent application Ser. No. 12/484,058, filed Jun. 12, 2009, entitled, "Platform Technology for Industrial Separations", by Lean et al.;

U.S. patent application Ser. No 12/973,083, filed Dec. 20, 2010, entitled, "Membrane Bioreactor (MBR) and Moving Bed Bioreactor (MBBR) Configurations for Wastewater Treatment", by Lean et al.;

U.S. patent application Ser. No. 12/967,147, filed Dec. 14, 2010, entitled, "All-Electric Coagulant Generation System", by Volkel et al.; and U.S. patent application Ser. No. 12/972,684, filed Dec. 20, 2010, entitled, "System and Apparatus for Seawater Organics Removal", by Meng H. Lean et al.

BRIEF DESCRIPTION

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which:

According to one aspect of the present disclosure, an electrocoagulation system including a dosing unit, a mixing unit and a buffer tank is provided. The dosing unit receives a fluid from an external source and injects an electrochemically generated coagulant into the fluid using one or more pairs of electrodes. The mixing unit mixes the coagulant with the fluid and is separate from the dosing unit. The buffer tank holds the fluid until particles contained in the fluid grow to a predetermined size.

According to another aspect of the present disclosure, a water treatment system including a dosing unit, a mixing unit, a buffer tank, and a filter and/or separator is provided. The dosing unit receives a fluid from an external source and injects an electrochemically generated coagulant into the fluid using one or more pairs of electrodes. The mixing unit mixes the coagulant with the fluid and is separate from the dosing unit. The buffer tank holds the fluid until particles contained in the fluid grow to a predetermined size. The filter and/or separator extracts particles of the predetermined size from the fluid.

According to another aspect of the present disclosure, a method of treating water using electrocoagulation is provided. A fluid is received from an external source and injected with an electrochemically generated coagulant using one or more pairs of electrodes. The fluid and the coagulant are mixed independent of the injection. The mixed fluid is buffered until particles contained in the fluid grow to a predetermined size and the particles are filtered and/or separated from the fluid.

BRIEF DESCRIPTION OF THE DRAWINGS

FIG. 3 is a table of sample calculations for the required current for a seawater treatment system employing an EC system;

DETAILED DESCRIPTION

Figure 1:
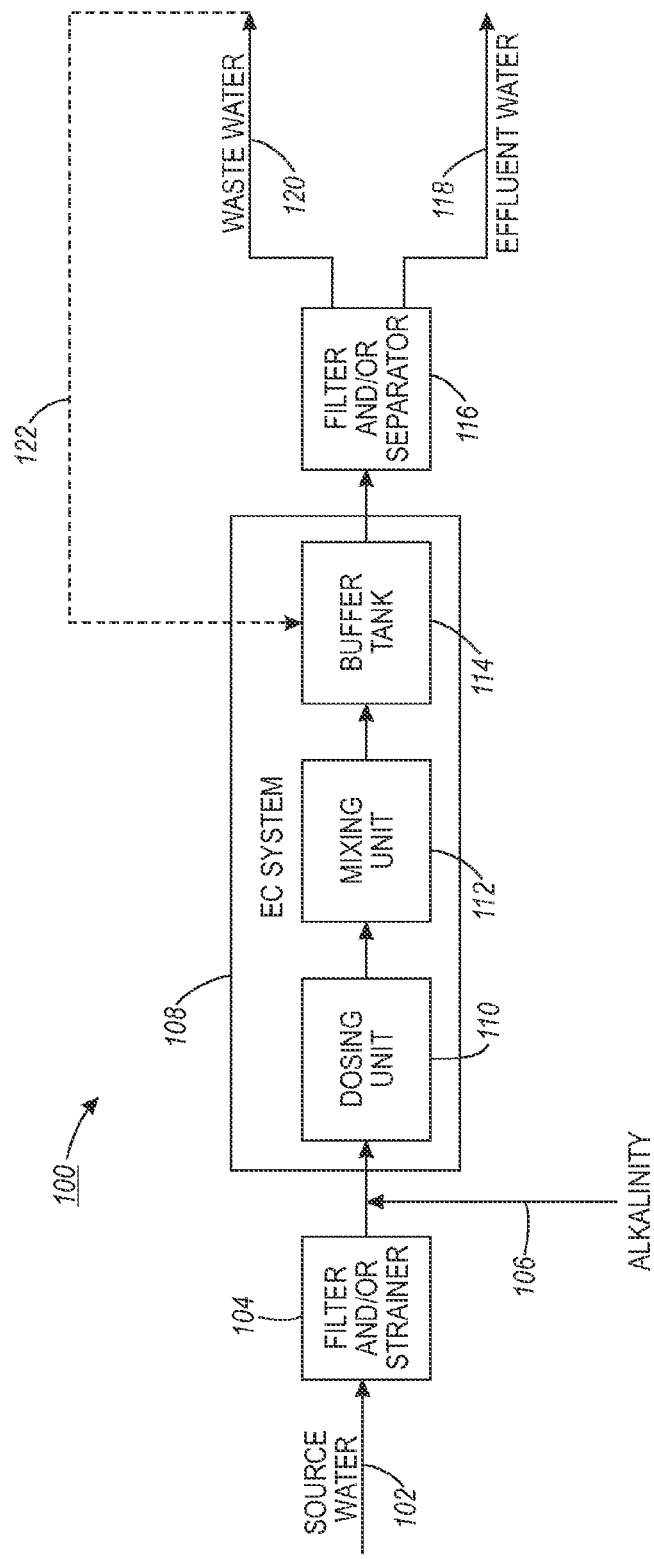
FIG. 1 is a block diagram of a water treatment system in accordance with aspects of the present application.

One or more embodiments or implementations are hereinafter described in conjunction with the drawings, where like reference numerals are used to refer to like elements throughout, and where the various features are not necessarily drawn to scale.

With reference to FIG. 1, a water treatment system 100 according to aspects of the present disclosure is illustrated. The water treatment system 100 receives source water 102 from a base water source, such as a pond, a creek, a river, a lake, an estuary, a well, a holding tank, or other location. In certain embodiments, the source water 102 is initially passed through a filter and/or strainer 104, where the filter and/or strainer 104 suitably includes openings sized to trap particulates above a certain size. For example, the openings may be sized to block particulates sized larger than 200 μm. The filter and/or strainer 104 is useful to avoid settling of large suspended particles in the water treatment system 100. Additionally or alternatively, in certain embodiments, alkalinity 106 is added to the source water 102 in the form of a base to adjust the pH of the source water 102. Any suitable base may be employed.

The source water 102, regardless of whether filtered and/or strained and/or dosed with the alkalinity 106, flows to an electrocoagulation (EC) system 108 where a dosing unit 110 thereof doses the source water 102 with an electrochemically generated coagulant. Notably, the dosing unit 110 need not uniformly dose the source water 102 with the coagulant. To generate the coagulant, the dosing unit 110 suitably includes one or more individually addressable pairs of electrodes that can provide the correct amount of coagulant molecules to the source water 102 below the maximal desired voltage. It is contemplated that the independent pair(s) of electrodes are configured in series or in parallel.

The maximal desired voltage is typically the voltage no higher than necessary to achieve the electrochemical reaction needed for generation of the coagulant. For iron, this is typically 1-1.5V, and, for aluminum, this is typically 2-3V. The maximal desired voltage is important from an efficiency standpoint. As the applied voltage across the independent pair(s) of electrodes increases, the number of electrochemical reactions generally increases. Hence, above the applied voltage necessary to achieve the electrochemical reaction needed for generation of the coagulant, unnecessary electrochemical reactions occur, thereby wasting energy.

The dosing is suitably adjusted manually and/or automatically, on the basis of the source water 102. For example, as the conductivity and/or the turbidity of the source water 102 increase, the dosing is adjusted. Dosing may be adjusted through modification of one or more of the flow rate through the dosing unit 110, the applied voltage across each of one or more of the independent pair(s) of electrodes, which of the independent pair(s) of electrodes are activated, the pH of the source water 102, and the like. As to which of the independent pair(s) of electrodes are activated, it is contemplated that, in certain situations, it may be appropriate to activate fewer than all the individual pair(s) of electrodes.

The residence of the source water 102 within this dosing unit 110 is preferably as short as possible, but not more than 20 seconds, before it enters a mixing unit 112 of the EC system 108. The mixing unit 112 efficiently distributes the coagulant through the source water 102 for floc conditioning. As noted above, the dosing unit 110 need not uniformly dose the source water 102 with the coagulant, whereby the mixing unit 112 is an important component of the EC system 108. Suitably, the mixing unit 112 is a static or active in line mixing unit, such as a spiral mixer, but any type of mixing unit is contemplated. In certain embodiments, the flow regime through the mixing unit 112 is adjustable to control the turbulence and mixing of the source water 102. As with the dosing unit 110, the mixing unit 112 is typically controlled automatically and/or manually, on the basis of the source water 102.

In view of the discussion heretofore, it is to be appreciated that the dosing unit 110 and the mixing unit 112 are physically separate. This allows individual optimization of the dosing and the mixing and allows for the EC system 108 to be independent of the quality of the source water 102. Further, this allows for easier flow rate scaling, as the different components of the EC system 108 follow different scale-up rules based on their core functionality.

After leaving the mixing unit 112, the source water 102 enters a buffer tank 114 of the EC system 108. The buffer tank 114 allows the floc particles to grow to the required size for efficient removal by a filter and/or separator 116 downstream from the buffer tank 114. As such, the filter and/or separator 116 typically dictates the duration with which the source water 102 needs to remain within the buffer tank 114 and/or the size of the buffer tank 114. Suitably, the buffer tank 114 is in line with the mixing unit 112 and/or provides a gently stirred environment to facilitate quick growth of the floc particles.

The filter and/or separator 116 receives the source water 102 from the buffer tank 114 and removes the grown floc particles above a certain size from the source water 102 through one or more of sedimentation, filtering, hydrodynamic separation, and the like. As such, the filter and/or separator 116 is suitably one or more of a filter (barrier), a hydrodynamic separator (e.g., a spiral-type or arc-type hydrodynamic separator), and the like. Typically, the removal of floc particles yields effluent water 118 and waste water 120.

Additionally or alternatively, the effluent water 118 may be passed through a follow-on filter, e.g. to protect against abnormal periods of operation, such as flow pulsation or sudden spikes in turbidity of the source water 102, or to remove dissolved solids using a reverse osmosis system.

The waste water 120 is suitably disposed of in an appropriate manner. For example, the waste water 120 may be recirculated through the water treatment system 100 along a feedback line 122. As another example, the waste water 120 may be passed to another water treatment or sludge treatment system.

Figure 2:
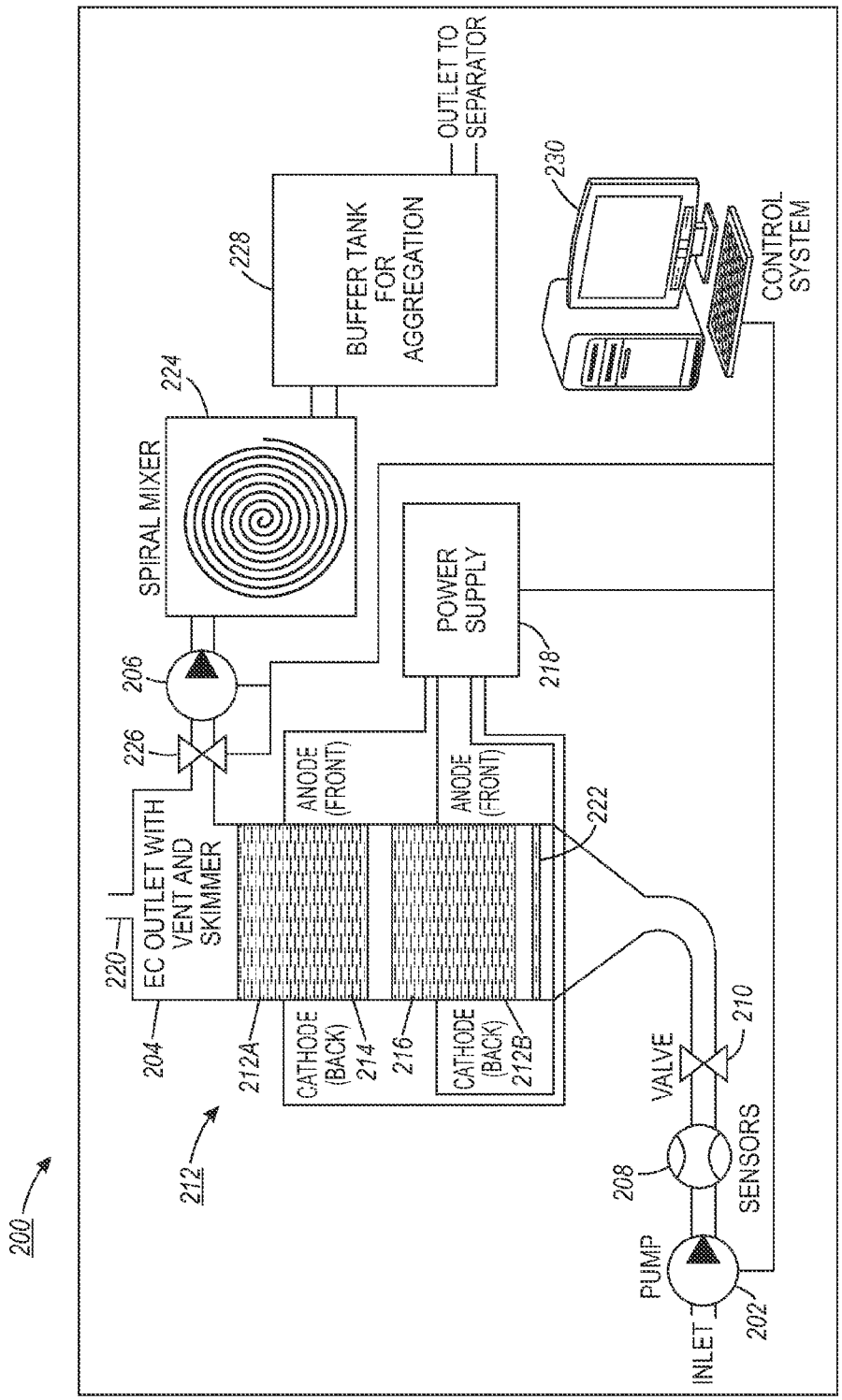
FIG. 2 is a detailed block diagram of an electrocoagulation (EC) system in accordance with aspects of the present application.

With reference to FIG. 2, detailed block diagram of an electrocoagulation (EC) system 200 according to aspects of the present disclosure is provided. The EC system 200 is a more specific embodiment of the EC system 108 of FIG. 1. Therefore, the discussion heretofore is equally amenable to the discussion to follow and components described hereafter are to be understood as paralleling like components discussed heretofore, unless noted otherwise.

An optional first pump 202 receives source water, such as the source water 102 of FIG. 1, from an external source and pumps the water to a dosing unit 204. The first pump 202 is suitably employed to manually and/or automatically control the flow rate of the source water through the EC system 200. However, in certain embodiments, a pump external to the EC system 200 or placed elsewhere within the EC system 200, such as a second pump 206, is employed in lieu of the first pump 202 to facilitate the flow of the source water through the EC system 200.

The source water flows through one or more optional sensors 208 and an optional first valve 210 before being received by the dosing unit 204. The sensor(s) 208 suitably measure one or more of the conductivity, the pH, the quality, and the like of the source water to facilitate manual and/or automatic dosing of the source water. The first valve 210 suitably allows the flow of the source water to the dosing unit 204 to be stopped and/or reduced. However, it is additionally or alternatively contemplated that the first valve 210 is employed to prevent backflow from the dosing unit 204. The first valve 210 may be manually and/or automatically controlled.

Upon entering the dosing unit 204, the source water suitably flows vertically therethrough past one or more independent pairs of electrodes 212, where a pump, such as the first pump 202, suitably facilities such a flow. However, a horizontal configuration is contemplated. For example, it is contemplated that the source water enters the dosing unit 204 at one vertically oriented side, passes through the independent pair(s) of electrodes 212, and leaves the dosing unit 204 on the opposite side. As illustrated, the individual pair(s) of electrodes 212 include a first pair of electrodes 212a and a second pair of electrodes 212b.

Each of the independent pair(s) of electrodes 212 includes a cathode (not shown) and an anode 214, 216 electrically coupled to a power supply 218. The power supply 218 suitably allows individual control, manual or otherwise, over the applied voltage and/or current of the individual pair(s) of electrodes 212. In certain embodiments, the power supply 218 is configured to switch between the independent pair(s) of electrodes 212 and/or between electrodes of the independent pair(s) of electrodes 212 at regular intervals for a more equal usage of the electrodes. For example, to switch between electrodes of one of the independent pair(s) of electrodes 212, the polarity of the independent pair of electrodes may be switched.

While the source water flows through the dosing unit 204, the independent pair(s) of electrodes 212 are suitably controlled manually or automatically to properly dose the source water on the basis of source water quality. As noted above, dosing may be adjusted through modification of the applied voltage across the independent pair(s) of electrodes 212 and/or which of the independent pair(s) of electrodes 212 are activated. The applied voltage is suitably no greater than the maximal desired voltage, which is typically the voltage no higher than necessary to achieve the electrochemical reaction needed for generation of the coagulant. For iron, this is typically 1-1.5V, and, for aluminum, this is typically 2-3V.

In certain embodiments, the dosing unit 204 may include a vent outlet 220 or the like to vent hydrogen gas generated at the cathodes of the independent pair(s) of electrodes 212 when the independent pair(s) of electrodes 212 are activated. Additionally or alternatively, the dosing unit 204 may include a skimmer (not shown) to remove floc floating to the top of the dosing unit 204. Floc tends to incorporate hydrogen generated at the cathodes of the independent pair(s) of electrodes 212, thereby causing the floc to float to the top of the dosing unit 204. Additionally or alternatively, the dosing unit 204 may include a baffle 222 or the like to spread the source water entering the dosing unit 204 throughout the dosing unit 204. Advantageously, this prevents stagnation points and/or counter vortices inside the dosing unit 204, which prevent all coagulant ions generated at the independent pair(s) of electrodes 212 from being swept with the source water.

After passing the independent pair(s) of electrodes 212, the source water leaves the dosing unit 204 and enters a mixing unit 224. Suitably, the source water is in the dosing unit 204 as short as possible, but no more than 20 seconds. To shorten the residence time inside the dosing unit 204, many parallel electrode pairs can be arranged to increase throughput. That is to say, many parallel electrode pairs can be arranged along the length of the dosing unit 204 and simultaneously activated.

In passing to the mixing unit 224, the source water suitably passes through the optional second pump 206 and/or an optional second valve 226. The second pump 206 suitably supplements the first pump 202 in controlling the flow of the source water through the EC system 200. However, it is contemplated that the second pump 206 acts in lieu of the first pump 202 or the first pump 202 acts in lieu of the second pump 206. The second valve 226 suitably allows the flow of the source water to the mixing unit 224 to be stopped and/or reduced. The second valve 226 and/or the second pump 206 may be manually and/or automatically controlled.

The mixing unit 224 efficiently distributes the coagulant through the source water for floc conditioning. Notably, the dosing unit 204 need not uniformly dose the source water with the coagulant. Therefore, it is to be understood that the mixing unit 224 is an important component of the EC system

200. In certain embodiments, the flow regime of the mixing unit 224 is manually and/or automatically adjustable to control the turbulence and mixing of the source water. In such embodiments, control is typically based on the source water.

The mixing unit 224 is suitably a static or active in line mixing unit, but any type of mixing unit is contemplated. For example, in certain embodiments and as illustrated, a spiral mixer is employed to facilitate mixing. While the spiral mixer may take a variety of forms, in at least some forms, the spiral mixer operates as described in U.S. Ser. No. 12/484,005, filed on Jun. 12, 2009, and entitled "Spiral Mixing unit for Floc Conditioning", incorporated herein by reference in its entirety.

As described in the "Spiral Mixing unit for Floc Conditioning", the spiral mixer provides a flash mixing where incoming source water is angled at the inlet to cause chaotic mixing when the source water impinges on a lower spiral channel wall of the spiral mixer. Further, a high shear driven fluidic flow rate in the channel is custom designed to achieve a shear rate which enhances the growth of dense and compact floc particles within a narrow, but uniform size range. In general, the higher the shear rate, the smaller the aggregated floc.

After passing through the mixing unit 224, the source water enters a buffer tank 228 so the floc particles can grow to a desired size before being removed from the source water. Suitably, the buffer tank 228 is in line with the mixing unit 224. A filter and/or separator, such as a filter and/or separator 116, used for removing the floc particles suitably dictates the duration with which the source water remains within the buffer tank 228 and the size of the buffer tank 228.

An optional electronic control system 230 suitably optimizes operation of the EC system 200. The control system 230 monitors the sensor(s) 208 to determine the source water quality. Based on this determination, the control system 230 controls the dosing and/or mixing using one or more of the first pump 202, the second pump 206, the first valve 210, the second valve 226, the power supply 218, and the like. Advantageously, the control system 230 can respond to changes in, for example, source water quality faster and more reliably than a manual operator. Additionally, the control system 230 can perform one or more of monitoring the usage of each of the pair(s) of electrodes 212, switching the polarity of one or more of the pair(s) of electrodes 212 in regular intervals, suggesting replacements of the pair(s) of electrodes 212 when needed, and the like.

A processor (not shown) of the control system 230 suitably carries out computer executable instructions stored on a non-transient computer readable medium (not shown) of the control system 230 to control and optimize the EC system 200. The processor includes one or more of a microprocessor, a microcontroller, a graphic processing unit (GPU), an application-specific integrated circuit (ASIC), a field-programmable gate array (FPGA), and the like. The memory includes one or more of a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth. In certain embodiments, a computer embodies the control system 230, as illustrated.

With reference to FIG. 3, a table 300 of sample calculations for the required current for a seawater treatment system employing an EC system, such as the EC system 108 of FIG. 1, is provided. The calculations are done as if the seawater treatment system treats 12,000 gallons of seawater per day with an equivalent dose of 10 mg/l $FeCl_3$. Residence time within a dosing unit of the EC system is calculated assuming the dosing unit includes a volume of 0.0025 $m^3$.

Figure 4:
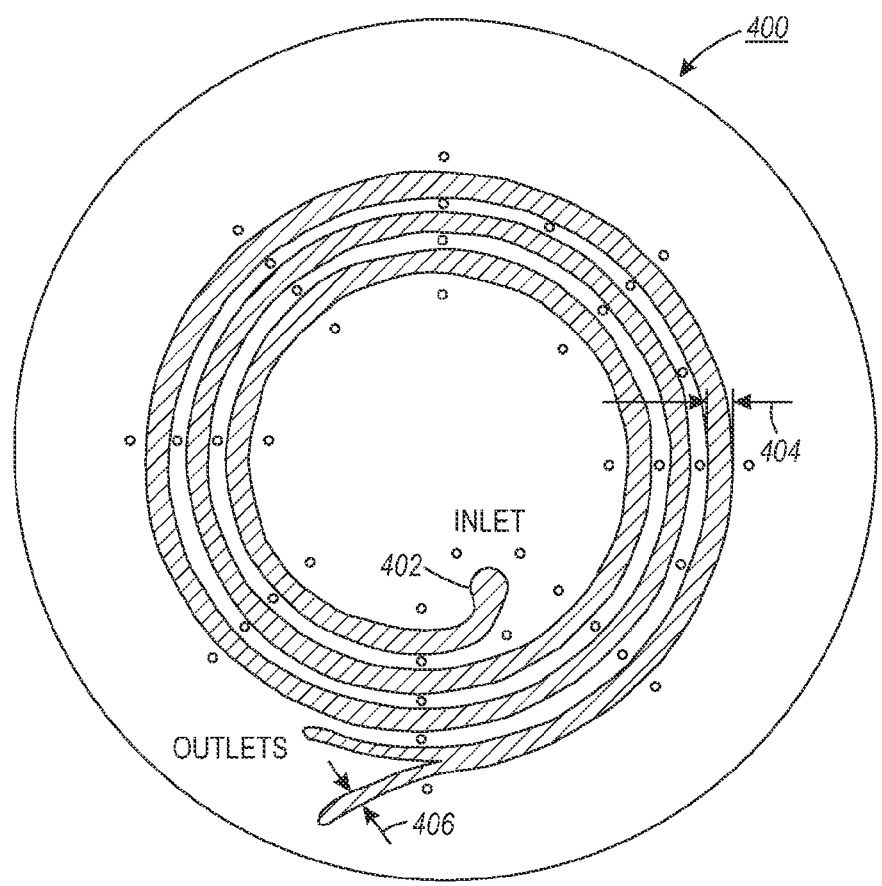
FIG. 4 is a single planar spiral-type hydrodynamic separator according to aspects of the present disclosure.

With reference to FIG. 4, a single planar spiral-type hydrodynamic separator 400 is illustrated. In certain embodiments, the separator 400 is employed within the water treatment system 100 of FIG. 1 as the filter and/or separator 116. The separator 400 has an inlet 402, at least one curved or spiral portion 404 and an outlet 406. This separator 400, in one form, may be cut from plastic. The type of plastic may vary as a function of the specific application and the environment in which it is implemented. In one variation of the separator 400, the center region of the separator 400 near the inlet 402 may be removed to allow access for an inlet coupler to be described hereafter. The spiral portion 404 of the separator 400 may take a variety of forms. For example, the spiral portion 404 may be converging or diverging. As a further example, the outlet 406 and inlet 402 locations may be interchanged to suit the application (e.g., for increasing or decreasing centrifugal forces).

The single planar spiral-type hydrodynamic separator 400 uses the curved channel of the spiral portion 404 to introduce a centrifugal force that generates a flow field in the fluid, e.g., water, that will sweep suspended particles to one side of the channel, including neutrally buoyant particles (e.g., particles having substantially the same density as water, or the fluid in which the particles reside). Separation efficiency depends on many parameters, including, for example, geometry of the channel and flow velocity. Forces on the particles include centrifugal forces and pressure driven forces, among others.

Figure 5:
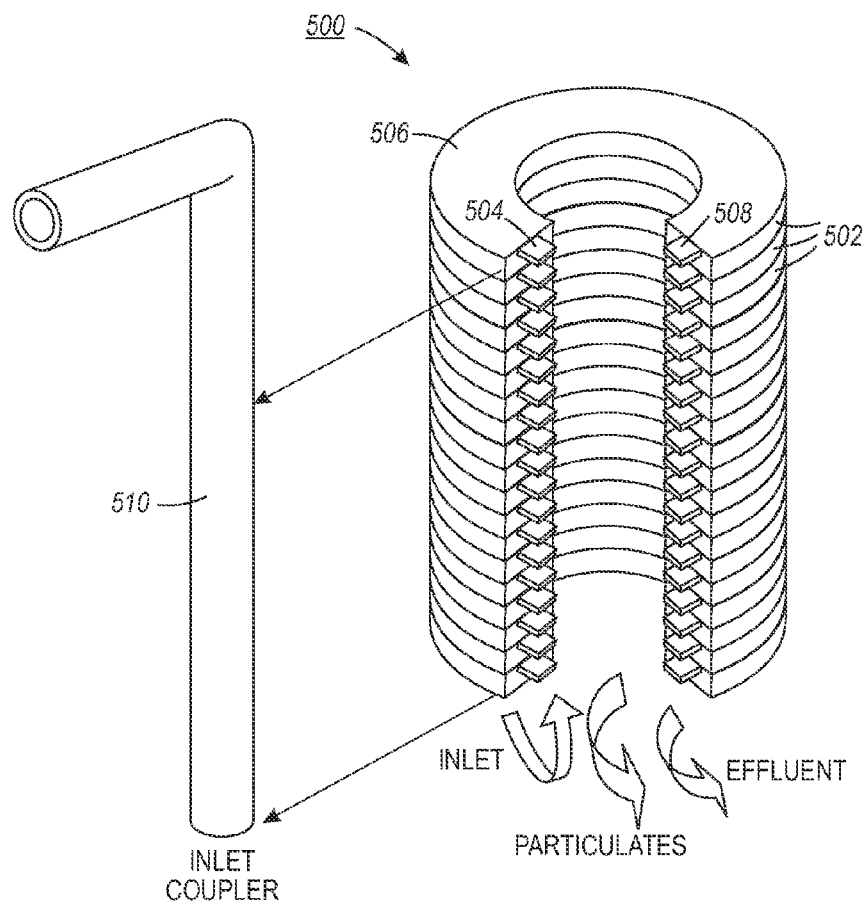
FIG. 5 is a multi-planar arc-type hydrodynamic separator according to aspects of the present disclosure; and, FIG. 6 is another multi-planar arc-type hydrodynamic separator according to aspects of the present disclosure.

With reference to FIG. 5, a multi-planar arc-type hydrodynamic separator 500 is illustrated. In certain embodiments, the separator 500 is employed within the water treatment system 100 of FIG. 1 as the filter and/or separator 116. The separator 500 operates as described in connection with the single planar spiral-type hydrodynamic separator 400 of FIG. 4 and comprises multiple planar curved arc segments 502 (e.g., fractional arc segments) that are vertically stacked as parallel channels to increase throughput. These planar curved arc segments 502 do not complete a loop for any one arc segment, although the characteristics and functions of a spiral-type hydrodynamic separator, such as the single planar spiral-type hydrodynamic separator 400 of FIG. 4, nonetheless apply to the arc segments 502. The arc segments 502 comprise an inlet 504, curved or arc section 506 and an outlet 508.

Also shown in FIG. 5 is an inlet coupler 510 that allows for an inlet of fluid from a common source to all of the separate arc segments 502. It should be appreciated that the inlet coupler 510 may take a variety of forms. In one form, the inlet coupler 510 is a cylinder and has perforations or a continuous slot corresponding to the inlet of each layer. At least one outlet coupler (not shown) may also be implemented. The outlet coupler(s) could resemble the inlet coupler.

Figure 6:
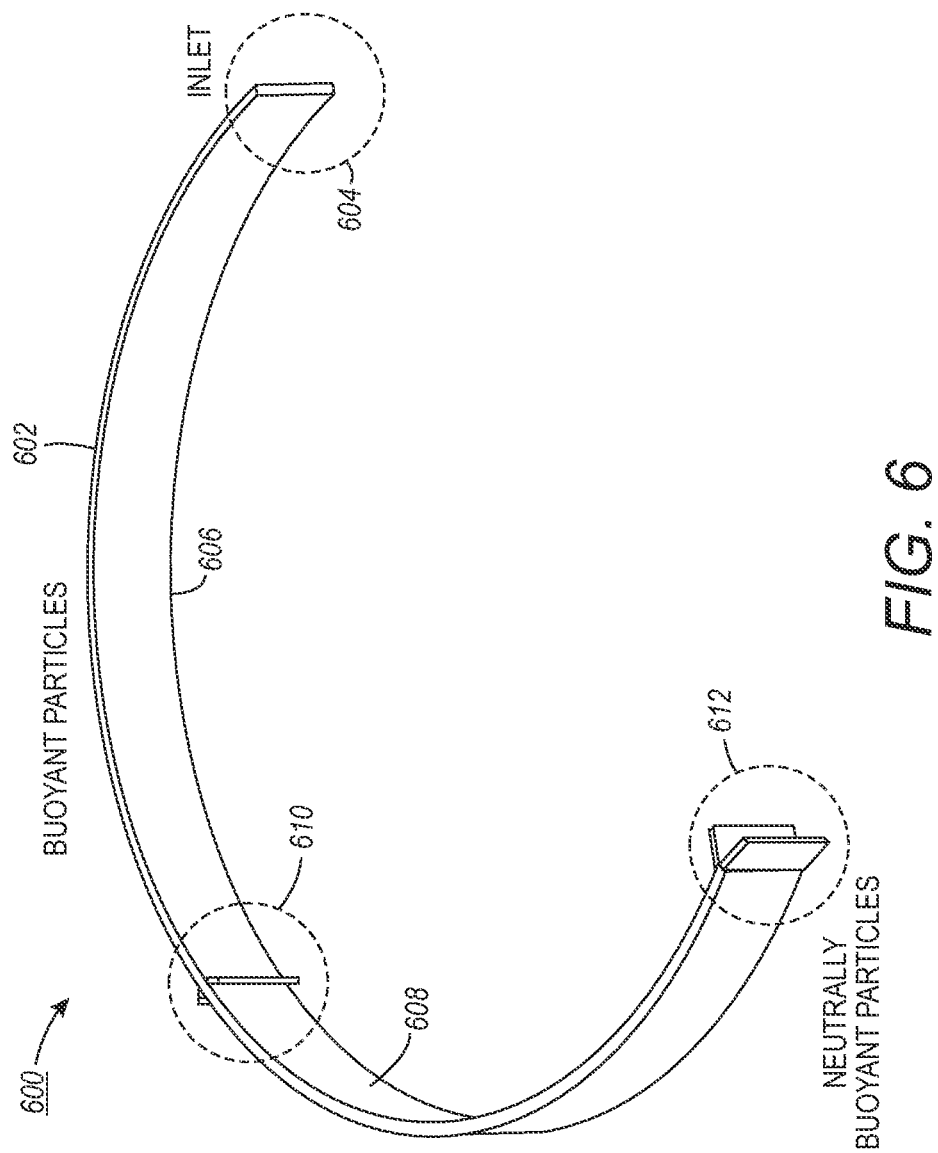

With reference to FIG. 6, another multi-planar arc-type hydrodynamic separator 600 is illustrated. In certain embodiments, the separator 600 is employed within the water treatment system 100 of FIG. 1 as the filter and/or separator 116. The separator 600 operates as described in connection with the single planar spiral-type hydrodynamic separator 400 of FIG. 4 and comprises stacked channels (not shown individually). The curved structure 602 has an inlet 604 (which may include an inlet coupler), curved portions 606 and 608, and at least one outlet 610 or 612. As shown, there is an outlet 610 for selected particles such as particles of a particular size or density (e.g., buoyant particles). The outlet 610 is positioned midway around the curve between the curved portion 606 and the curved portion 608. The second outlet 612 for selected particles of a second size or density (e.g., neutrally buoyant particles) is positioned at an end of the curve 608 opposite the inlet 604. In general, these outlets 610 and 612 can be used to remove particles of varying sizes or densities from the fluid flow. As above, at least one outlet coupler may also be utilized.

For more information pertaining to FIGS. 4-6, attention is directed to U.S. Ser. No. 12/120,093, filed on May 13, 2008, and entitled "Fluidic Structure for Membraneless Particle Separation", incorporated herein by reference in its entirety. Further, for additional forms of hydrodynamic separators suitably employed as the filter and/or separator 116 of FIG. 1, attention is directed to U.S. Ser. No. 11/606,458, filed Nov. 30, 2006, and entitled "Serpentine Structures for Continuous Flow Particle Separations"; U.S. Ser. No. 11/606,460, filed Nov. 30, 2006, and entitled "Particle Separation and Concentration System"; U.S. Ser. No. 11/725,358, filed Mar. 19, 2007, and entitled "Vortex Structure for High Throughput Continuous Flow Separation"; U.S. Ser. No. 11/936,753, filed Nov. 7, 2007, and entitled "Device and Method for Dynamic Processing in Water Purification"; U.S. Ser. No. 11/936,729, filed Nov. 7, 2007, and entitled "Fluidic Device and Method for Separation of Neutrally Buoyant Particles"; U.S. Ser. No. 12/328,682, filed Dec. 4, 2008, and entitled "Flow De-Ionization using Independently Controlled Voltages"; U.S. Ser. No. 12/484,071, filed Jun. 12, 2009, and entitled "Method and Apparatus for Continuous Flow Membrane-Less Algae Dewatering"; U.S. Ser. No. 12/120,153, filed May 13, 2008, and entitled "Method and Apparatus for Splitting Fluid Flow in a Membraneless Particle Separation System"; U.S. Ser. No. 12/615,663, filed Nov. 10, 2009, and entitled "Desalination using Supercritical Water and Spiral Separation"; U.S. Ser. No. 12/234,373, filed Sep. 19, 2008, and entitled "Method and System for Seeding with Mature Floc to Accelerate Aggregation in a Water Treatment Process"; U.S. Ser. No. 12/484,038, filed Jun. 12, 2009, and entitled "Stand-Alone Integrated Water Treatment System for Distributed Water Supply to Small Communities"; and, U.S. Ser. No. 12/484,058, filed Jun. 12, 2009, and entitled "Platform Technology for Industrial Separations", all of which are incorporated herein by reference in their entireties.

The disclosure has been made with reference to preferred embodiments. Obviously, modifications and alterations will occur to others upon reading and understanding the preceding detailed description. It is intended that the preferred embodiments be construed as including all such modifications and alterations insofar as they come within the scope of the appended claims or the equivalents thereof.

The invention claimed is:

1. An electrocoagulation system comprising:
a variable dosing unit configured to receive source water from an external source, and the variable dosing unit further including one or more pairs of electrodes, the one or more pairs of electrodes configured as part of the variable dosing unit to electrochemically generate a desired amount of electrocoagulant and to inject the electrochemically generated electrocoagulant into the source water, the desired amount of electrocoagulant being variable and at least in part dependent on a basis of the source water;
a variable mixing unit configured to mix the electrocoagulant with the source water, wherein the variable mixing unit is separate from the variable dosing unit and the variable dosing unit is positioned in the system prior to the variable mixing unit to cause flow of the source water to be from the variable dosing unit to the variable mixing unit, the variable mixing unit being variable to achieve a desired amount of mixing of the electrocoagulant, the prescribed amount of mixing at least in part dependent on a basis of the source water or the desired amount of electrocoagulant; and,
a buffer tank configured to hold the source water, having the electrocoagulant, until particles contained in the source water grow to a predetermined size, wherein the buffer tank is separate from the variable mixing unit, and the variable mixing unit is positioned in the system at a location prior to the buffer tank to cause flow of the source water to be from the variable mixing unit to the variable buffer tank.

2. The electrocoagulation system of claim 1, further including:
a controller configured to independently control operation of the variable dosing unit and to independently control operation of the variable mixing unit.

3. The electrocoagulation system of claim 2, further including a sensor arrangement configured to sense at least one of a conductivity of the source water and a turbidity of the source water; and
wherein the controller is configured to control at least one of the variable dosing unit and the variable mixing unit based on at least one of the conductivity of the source water and the turbidity of the source water.

4. The electrocoagulation system of claim 2, wherein the controller is configured to control at least one of the variable dosing unit and the variable mixing unit by adjusting one or more of a flow rate of the source water, an applied voltage across each of one or more of the pairs of electrodes, and which of the pairs of electrodes are activated.

5. The electrocoagulation system of claim 2, wherein the controller is configured to control operation of the pairs of electrodes by switching between electrodes of the pairs of electrodes at regular intervals to achieve uniform wear of the electrodes.

6. The electrocoagulation system of claim 1, wherein the variable mixing unit is a spiral mixer configured to receive the source water from the variable dosing unit to perform mixing operations on the source water and to pass the source water to the buffer tank.

7. The system of claim 6, further including a pump and valve configuration positioned within the system immediately prior to the spiral mixer and configured to control the flow of the source water to the spiral mixer to thereby control mixing of the source water and electrocoagulant.

8. The electrocoagulation system of claim 1, wherein the controller is configured to control operation of the variable dosing unit by applying a voltage to each of one or more of the pairs of electrodes at a level no more than necessary to inject the prescribed amount of electrocoagulant, wherein the prescribed amount of electrocoagulant is based on the source water.

9. The system of claim 1, further including a baffle positioned within the variable dosing unit, the baffle positioned and configured to spread out the source water entering the variable dosing unit.

10. A water treatment system comprising:
a variable dosing unit configured to receive source water from an external source, and the variable dosing unit further having one or more pairs of electrodes the one or more pairs of electrodes configured as part of the dosing unit to electrochemically generate a desired amount of electrocoagulant and to inject the electrochemically generated electrocoagulant into the source water;

a spiral mixer configured to variably mix the electrocoagulant with the source water, wherein the spiral mixer is separate from the variable dosing unit and the variable dosing unit is positioned in the system at a location prior to the spiral mixer to cause flow of the source water to be from the variable dosing unit to the spiral mixer;

a buffer tank configured to hold the source water, having the electrocoagulant, until particles contained in the source water grow to a predetermined size, wherein the buffer tank is separate from the spiral mixer and the spiral mixer is positioned in the system at a location prior to the buffer tank to cause flow of the source water to be from the spiral mixer to the buffer tank; and, a filter and/or separator configured to extract particles of the predetermined size from the source water.

11. The water treatment system of claim 10, wherein the filter and/or separator is a hydrodynamic separator.

12. The water treatment system of claim 10, further comprising:

a controller configured to independently control operation of the variable dosing unit and to independently control operation of the spiral mixer to vary mixing.

13. The water treatment system of claim 12, further including a sensor arrangement configured to sense at least one of a conductivity of the source water and turbidity of the source water, wherein the controller is configured to control operation of at least one of the variable dosing unit and the spiral mixer based on at least one of the conductivity of the source water and/or the turbidity of the source water.

14. The water treatment system of claim 12, wherein the controller is configured to control at least one of the variable dosing unit and the spiral mixer by adjusting one or more of a flow rate of the source water, an applied voltage across each of one or more of the pairs of electrodes, and which of the pairs of electrodes are activated.

15. The water treatment system of claim 12, wherein the controller is configured to control operation of the pairs of electrodes by switching between electrodes of the pairs of electrodes at regular intervals to achieve uniform wear of the electrodes.

16. The water treatment system of claim 10, wherein the controller is configured to control operation of the variable dosing unit by applying a voltage applied to each of one or more of the pairs of electrodes at a level no more than necessary to inject the prescribed amount of electrocoagulant, wherein the desired prescribed amount of electrocoagulant is based on the source water.

17. The system of claim 10, further including a feedback line positioned between the filter and/or separator and the buffer tank, wherein the feedback line is configured to carry wastewater from at least one of the filter and separator to the buffer tank.

18. A method of treating water using electrocoagulation, said method comprising:

receiving source water from an external source;

injecting the source water with a desired amount of electrochemically generated electrocoagulant using one or more pairs of electrodes, wherein the injecting occurs in a separately configured variable dosing unit;

passing the source water from the variable dosing unit to a separately configured variable mixing unit;

mixing the source water and the electrocoagulant a desired amount in the separately configured variable mixing unit independent of the injection in the variable dosing unit;

passing the source water from the variable mixing unit to a separately configured buffer tank;

buffering the mixed source water in the buffer tank until particles contained in the source water grow to a predetermined size;

passing the source water from the buffering tank to a filter and/or separator; and, filtering and/or separating the particles and the source water by the filter and/or separator.

19. The method of claim 18, further comprising:

adjusting an amount of electrocoagulant injected into the source water on the basis of the source water.

20. The method claim 19, wherein the adjusting includes adjusting one or more of a flow rate of the source water, an applied voltage across each of one or more of the pairs of electrodes, and which of the pairs of electrodes are activated.

21. The method of claim 18, further comprising:

switching between electrodes of the pairs of electrodes at regular intervals to achieve uniform wear of the electrodes.

22. The method of claim 18, wherein at least one of the filtration and separation is performed using a hydrodynamic separator.

23. The method of claim 18, wherein the source water is in the variable dosing unit for no more than 20 seconds.

* * * * *